United States Patent
Merrill et al.

(10) Patent No.: US 6,525,304 B1
(45) Date of Patent: Feb. 25, 2003

(54) CIRCUITRY FOR CONVERTING ANALOG SIGNALS FROM PIXEL SENSOR TO A DIGITAL AND FOR STORING THE DIGITAL SIGNAL

(75) Inventors: Richard B. Merrill, Woodside, CA (US); Richard F. Lyon, Los Altos, CA (US); Richard M. Turner, Mountain View, CA (US); Milton B. Dong, Saratoga, CA (US)

(73) Assignee: Foveon, Inc., Santa Clara, CA (US)

( * ) Notice: Subject to any disclaimer, the term of this patent is extended or adjusted under 35 U.S.C. 154(b) by 61 days.

(21) Appl. No.: 09/724,258

(22) Filed: Nov. 28, 2000

(51) Int. Cl.$^7$ .............................................. H01L 27/00

(52) U.S. Cl. ................................... 250/208.1; 348/308

(58) Field of Search ...................... 250/208.1, 214 A, 250/214 R; 348/294, 297, 308, 296, 301; 341/155, 161; 257/272; 356/218

(56) References Cited

U.S. PATENT DOCUMENTS

| | | | |
|---|---|---|---|
| 5,227,887 A | 7/1993 | Dohi et al. | 358/213.27 |
| 5,276,521 A | 1/1994 | Mori | 358/213.31 |
| 5,461,425 A | 10/1995 | Fowler et al. | 348/294 |
| 5,742,047 A * | 4/1998 | Buhler et al. | 250/208.1 |
| 5,801,657 A | 9/1998 | Fowler et al. | 341/155 |
| 6,330,030 B1 * | 12/2001 | O'Connor | 348/297 |
| 6,377,303 B2 * | 4/2002 | O'Connor | 341/155 |

FOREIGN PATENT DOCUMENTS

| | | | | |
|---|---|---|---|---|
| EP | 0 605 898 A1 | 7/1994 | ......... | H01L/27/146 |
| EP | 0 707 416 A2 | 4/1996 | ............ | H04N/3/15 |
| EP | 0 954 167 A2 | 3/1999 | | |
| WO | WO 99/27708 A1 | 6/1999 | ............ | H04N/3/14 |

OTHER PUBLICATIONS

Fowler et al., Techniques for Pixel Level Analog to Digital Conversion.

Yang et al., A 128×128 Pixel CMOS Area Image Sensor with Multiplexed Pixel Level A/D Conversion.

Fowler et al., A CMOS Area Image Sensor with Pixel Level A/D Conversion.

Yang et al., A Nyquist–Rate Pixel–Level ADC for CMOS Image Senors.

Yang et al., A 640×512 CMOS Image Sensor with Ultrawide Dynamic Range Floating–Point Pixel–Level ADC.

Nitayama et al., Future Directions for DRAM Memory Cell Technology.

Chye Huat Aw, et al. "A 128×128–Pixel Standard–CMOS Image Sensor With Electronic Shutter", IEEE International Solid–State Circuits Conference, 1996, pp. 4–39 to 4–40.

Guang Yang, et al. "A Snap–Shot CMOS Active Pixel Imager For Low–Noise, High–Speed Imaging", IEEE, 1998, pp. 45–48.

Hon–Sum Philip Wong, "CMOS Image Sensors–Recent Advances and Device Scaling Considerations", IEDM, 1997 IEEE, pp. 201–204.

(List continued on next page.)

Primary Examiner—Stephone B. Allen
Assistant Examiner—Bradford Hill
(74) Attorney, Agent, or Firm—Sierra Patent Group, Ltd.

(57) ABSTRACT

A digital pixel sensor is formed on a semiconductor substrate and comprises a phototransducer responsive to light for providing an analog output signal that is a function of an incident amount of light. A comparator is configured to compare the analog output signal and a ramp reference signal. A plurality of n DRAM cells are configured to store an at least n-bit digital signal in response to the output of the comparator. An array of digital pixel sensors is also disclosed.

24 Claims, 3 Drawing Sheets

OTHER PUBLICATIONS

Hon–Sum Philip Wong, et al. "*CMOS Active Pixel Image Sensors Fabricated Using a 1.8–V, 025–µm CMOS Technology*", IEEE, Apr., 1998, pp. 889–894.

Orly Yadid–Pecht, et al. "*A Random Access Photodiode Array for Intelligent Image Capture*", IEEE Transactions on Electron Devices, vol. 38, No. 8, Aug. 1991, pp. 1772–1780.

Hiroki Miura, et al., "*A 100 Frame/s CMOS Active Pixel Sensor For 3D–Gesture Recognition System*", IEEE International Solid–State Circuits Conference, Jun. 1999, pp. 142–143.

Yoshiaki Hagiwara, "*High–Density and High–Quality Frame Transfer CCD Imager With Very Low Smear, Low Dark Current, and Very High Blue Sensitivity*", IEEE Transactions on Electron Devices, vol. 43, No. 12, Dec. 1996, pp. 2122–2130.

Peter B. Denyer, et al., "*On–Chip CMOS Sensors For VLSI Imaging Systems*", VLSI 91, Proceedings of the IFIP TC 10/WG 10.5 International Conference on Very Large Scale Integration, Aug. 1991, pp. 4b.1.1 to 4b.2.1.

Fowler, et al., "Techniques for Pixel Level Analog to Digital Conversion"; Information Systems Laboratory, Sanford University, Abstract and Introduction, 11 pages.

Yang, et al., "A 128×128 pixel CMOS Area Image Sensor with Multiplexed Pixel Level A/D Conversion"; Information Systems Laboratory; Stanford University; Sanford, CA 94305; pp. 1–4.

Yang, et al., "Anyquist Rate Pixel Level ADC for CMOS Image Sensors", Information Systems Laboratory; Sanford University, Sanford, CA 94305; pp. 1–4.

Fowler, et al., a CMOS Area Image Sensor with Pixel Level A/D Conversion, Information Systems Laboratory; Sanford University, Sanford, CA 94305 Nov. 20, 1995; pp. 111.

Yang, et al., "A 640×512 CMOS Image Sensor with Ultra Wide Dynamic Range Floating–Point Pixel–Level ADC"; Information System Laboratory, Electrical Engineering Dept.; Stanford University, Sep. 8, 1998; coversheet, pp. 1–10.

Yang, et al., "A 640×512 CMOS Image Sensor with Ultrawide Dynamic Range Floating–Point Pixel–Level ADC"; IEEE Journal of Solid–State Circuits, vol. 34; No. 12, Dec. 1999; pp. 1821–1834.

Yang, et al., "A Nyquist–Rate Pixel–Level ADC for CMOS Image Sensors", IEEE Journal of Solid–State Circuits, vol. 34, No. 3, Mar. 1999; pp. 348–356.

* cited by examiner

CIRCUITRY FOR CONVERTING ANALOG SIGNALS FROM PIXEL SENSOR TO A DIGITAL AND FOR STORING THE DIGITAL SIGNAL

BACKGROUND OF THE INVENTION

1. Field of the Invention

The present invention relates to solid-state image sensors. More particularly, the present invention relates to a frame store imager that converts and stores the image information digitally in each pixel.

2. The Prior Art

Frame store imagers are known in the prior art. Thus far, frame store imaging schemes have usually been based on storage of the image signal level on an intra-pixel capacitor as an analog voltage.

While analog pixel sensors have been used successfully, they have several problems. First, leakage during readout limits the signal-to-noise ratio and also the maximum array size. Transistor scaling will decrease the size of transistor devices but at the expense of increased noise of numerous kinds. It is presently believed that pixel size will be limited to about 3 um by optical properties such as diffraction and that Moore's law will continue to apply, thus making inevitable the use of more transistors per pixel.

There have been several frame store imaging schemes that convert the analog image signal to a digital signal within the pixel. U.S. Pat. No. 5,461,425 to Fowler et al. and U.S. Pat. No. 5,801,657 to Fowler et al. are examples of such schemes.

BRIEF DESCRIPTION OF THE INVENTION

According to a first aspect of the present invention, a digital storage pixel sensor according to the present invention includes a photodiode coupled to a reset potential through a reset transistor that reverse biases the photodiode. The photodiode is coupled to a storage capacitance through a transfer transistor. The storage capacitor is coupled to a first input of a voltage comparator. A second input of the voltage comparator is coupled to the analog ramp voltage output of a ramp generator. The ramp generator starts an n-bit counter at the beginning of each voltage ramp. As presently preferred, the n-bit counter is configured as a Gray code counter.

After an exposure interval, the transfer switch turns off to temporarily store the analog signal at the first input to the comparator. When the ramp voltage passes the voltage established by charge accumulation in the pixel sensor, the comparator changes state. The comparator output writes the present count of the counter into an n-bit dynamic random access memory (DRAM) word disposed in the imager. To read the memory contents, the counter outputs are disabled and a read signal is supplied to the n-bit DRAM word. The counter lines then serve as output column lines for the imager's DRAM.

According to a second aspect of the present invention, an array of digital storage pixel sensors is provided. According to a presently preferred embodiment, each imager in the array is served by the same n-bit counter and analog ramp voltage and the n-bit column line outputs are common to all digital storage pixel sensors in individual columns of the array and also serve as column output lines for all of the DRAM words in individual columns of the array. DRAM words in individual rows of the array are selected for output by row-enable signals provided to the digital storage pixel sensors in individual rows of the array.

BRIEF DESCRIPTION OF THE DRAWING FIGURES

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure. For example, the illustrative embodiments of the present invention are disclosed using all N-Channel MOS transistor switches, but persons of ordinary skill in the art will appreciate that other technologies could be employed as well. Such skilled persons will readily understand how to adjust the polarities of the various potentials applied to the circuits disclosed herein to implement an embodiment of the present invention employing such other technologies.

Figure 1:
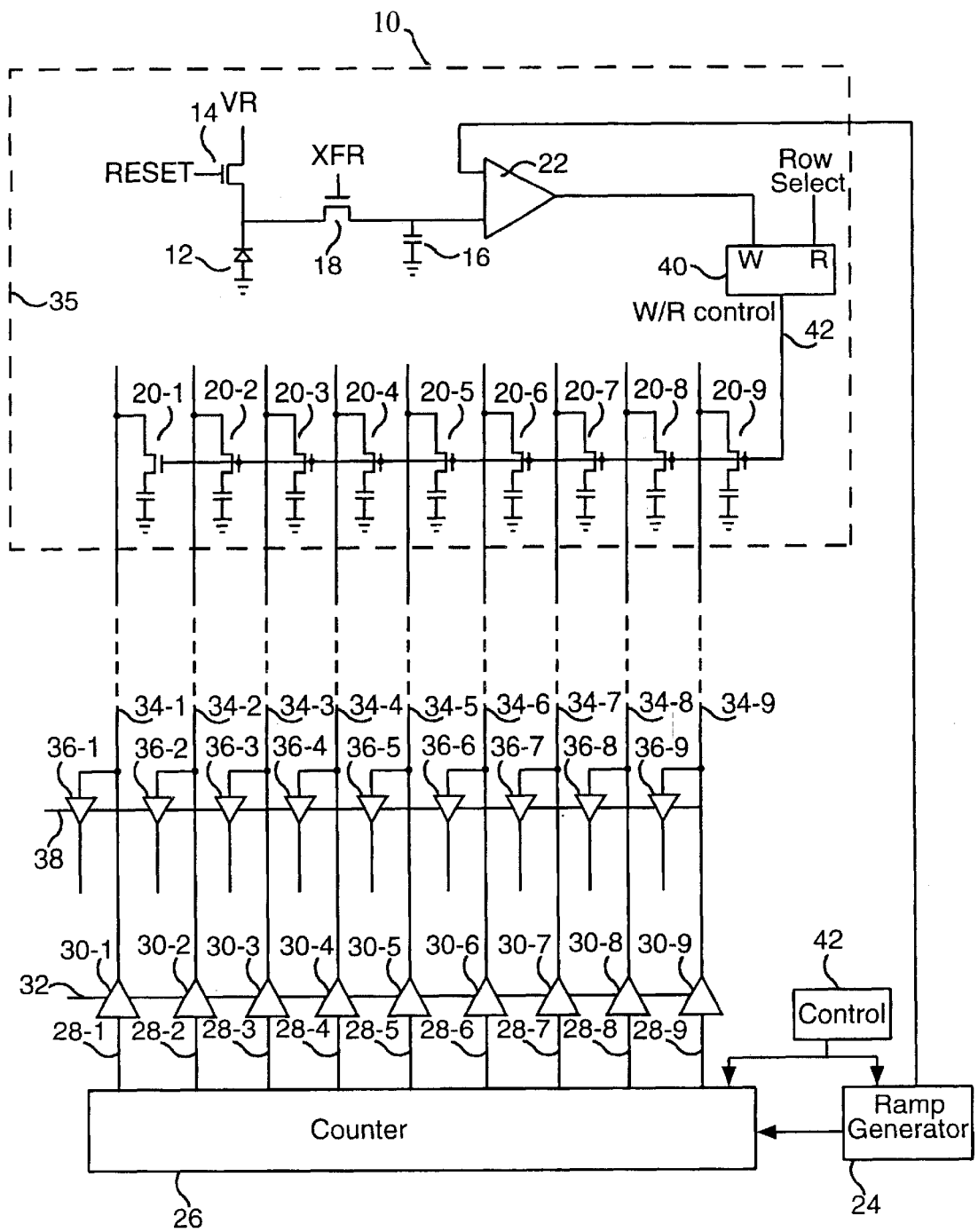
FIG. 1 is a diagram of an illustrative digital storage pixel sensor according to the present invention.

Referring first to FIG. 1, a diagram of a single digital storage pixel sensor 10 for a digital frame store imager according to the present invention is presented in block diagram form. Photodiode 12 is the photosensor of the digital storage pixel sensor 10 and is shown connected reverse biased with its anode coupled to a fixed potential (shown as ground) and its cathode coupled to the source of MOS N-Channel Reset transistor 14. The drain of MOS N-Channel Reset transistor 14 is coupled to a source of reset potential VR and the gate of MOS N-Channel Reset transistor 14 is coupled to a RESET signal line.

The cathode of photodiode 12 is also coupled to a temporary storage capacitor 16 through MOS N-Channel Transfer transistor 18. The gate of MOS N-Channel Transfer transistor 16 is coupled to a XFR signal line. Temporary storage capacitor 16 may be formed from the gate or source/drain terminal of a MOS capacitor and have a capacitance in the range of from about 1 fF to about 100 fF.

The digital storage mechanism utilized by the present invention is semiconductor memory, preferably in the form of dynamic random access memory (DRAM). There are numerous well-known and available DRAM architectures, and recently DRAM cells have become available from foundries as the system-on-a-chip trend in integrated circuit design progresses. For the purpose of this disclosure, a DRAM cell is a structure that stores a signal dynamically as a charge, through am access transistor that couples a storage node to an I/O node. A DRAM word is a group of DRAM cells controlled collectively to store an n-bit code. Using present technology, a DRAM bit occupies about 0.18 square microns for a 0.14 micron process (see, for example, the paper A. Nitayama, Y. Koyama, and K. Hieda, Future Directions For DRAM Memory Cell Technology, IEDM 98-355 (1998)).

In the illustrative embodiment of FIG. 1, each pixel resolves the photocharge voltage into 9 bits, or 1 part in 512, as shown by representative DRAM cells 20-1 through 20-9. Persons of ordinary skill in the art will appreciate that the resolution of the digital pixel sensor 10 of the present invention will depend on the number of bits of resolution per pixel and that resolutions other than 9 bits are contemplated for use in the present invention.

In the embodiment of FIG. 1, the digital data stored in the digital storage pixel sensor 10 is generated by comparing in comparator 22 the voltage stored on temporary storage capacitor 16 with a voltage generated by ramp generator 24. As will be appreciated by persons of ordinary skill in the art, ramp generator 24 may provide an output voltage that is linear as a function of time. In addition, ramp generator 24 may provide an output voltage that is non-linear as a function of time, such as a logarithmic function or other functions that can define the photocharge-to-output-code transfer curve of the digital pixel sensor 10 of the present invention.

As will be disclosed herein, when the digital storage pixel sensor 10 has been reset and exposure begins, ramp generator 24 is also reset. Counter 26 is coupled to ramp generator 24 and is also reset at the beginning of the exposure cycle by a signal from amp generator 24 indicating the start of the ramp. Counter 26 is preferably a Gray code counter so that, if the comparator 22 triggers during a code transition, the uncertainty (the digital error of the digital pixel sensor 10) will be limited to only one count. The output lines 28-1 through 28-9 from counter 26 are coupled to the individual DRAM cells in the digital pixel sensors 10 through tri-state buffers 30-1 through 30-9, respectively. The output control line 32 of tri-state buffers 30-1 through 30-9 is driven by a signal that enables the outputs of tri-state buffers 30-1 through 30-9 during the A/D conversion interval of the digital storage pixel sensor 10 to couple the counter outputs to the DRAM cells via column lines 34-1 through 34-9. The outputs of tri-state buffers 30-1 through 30-9 are disabled during the readout process.

During the readout interval, the outputs of the DRAM cells 20-1 through 20-9 are driven onto column lines 34-1 through 34-9 and read out of the array via tri-state read amplifiers 36-1 through 36-9, respectively. The output control line 38 of tri-state read amplifiers 36-1 through 36-9 is driven by a signal (such as the row-select signal) that disables the outputs of tri-state read amplifiers 36-1 through 36-9 during the A/D conversion interval of the digital storage pixel sensor 10 and enables the outputs during the readout interval.

Counter 26 is clocked at a clock rate matched to the output of ramp generator 24 such that the full count of counter 26 occurs at the maximum light exposure level of the digital pixel sensor 10. When the output voltage from ramp generator 24 is equal to the voltage produced by the accumulated photocharge on temporary storage capacitor 16, the output signal from comparator 22 causes DRAM write/read control unit 40 to write the contents of the 9-bit counter present on column lines 34-1 through 34-9 into the DRAM cells in the digital pixel sensor 10.

The digital storage pixel sensor 10 of the present invention may be read by applying a ROW-SELECT signal to the read input of DRAM write/read control unit 40. DRAM write/read control unit 40 drives the common gate line 42 of DRAM memory cells 20-1 through 20-9 driving the stored data onto the column output lines 34-1 through 34-4. As previously noted, the counter output lines 28-1 through 28-9 are disconnected from the DRAM memory cells 20-1 through 20-9 during readout by, for example, placing them in a high-impedance state as is well known in the art.

As will be readily appreciated by persons of ordinary skill in the art, the particular circuitry utilized in an actual embodiment of write/read control unit 40 will be dictated by the nature of the DRAM cells 20-1 through 20-9. Accordingly, while FIG. 1 schematically shows coupling between write/read control 40 and the gates of the DRAM memory cell transistors 20-1 through 20-9, persons of ordinary skill in the art will appreciate that other terminals of the DRAM cells may need to be biased for writing information therein and will readily understand how to provide any necessary voltages. After particular DRAM cells are selected for use in digital storage pixel sensors 10 according to the present invention, selection of particular circuitry for write/read control unit 40 becomes a trivial task well within the ordinary level of skill in the art.

A simple example of circuitry suitable for use as write/read control unit 40 is a two-input CMOS NAND gate having one of its inputs coupled to the output of comparator 22 and its other input coupled to the row-select line. When the ramp voltage exceeds the signal voltage on capacitor 16, the output of comparator 22 rises, the output of NAND gate falls, storing the current counter code in the DRAM word. Persons of ordinary skill in the art will observe that the row-select line must be held high during that conversion time, and is pulsed low to read a word.

Figure 2:
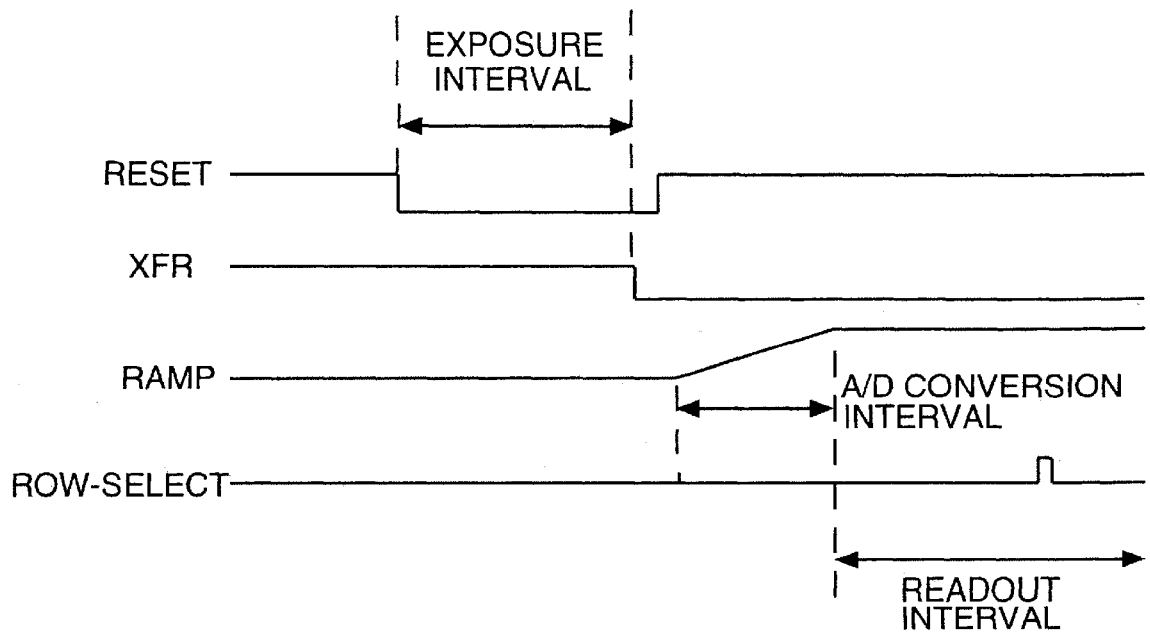
FIG. 2 is a timing diagram showing a first method for operating the digital storage pixel sensor of FIG. 1.

Referring now to FIG. 2, a timing diagram illustrates a first method for operating the digital pixel sensor 10 of FIG. 1. First, a RESET signal is asserted on the gate of MOS N-Channel Reset transistor 14 and the XFR signal is asserted at the gate of MOS N-Channel Transfer transistor 18. The RESET signal is asserted for a period of time long enough to assure that temporary storage capacitor 16 is driven to the Reset potential VR.

During the Reset period, or at any time prior to the end of the photointegration period, the ramp generator 24 and the counter 26 are also reset to their initial states from ramp/counter control unit 44. Next, the image-capture period begins when the RESET signal is de-asserted as shown in FIG. 2. At this point, photocharge begins accumulating at the cathode of photodiode 12 and, through MOS N-Channel Transfer transistor 18, begins to lower the voltage on temporary storage capacitor 16. To end the exposure interval, XFR is de-asserted, after which ramp/counter control unit 44 causes the ramp generator 24 and counter 26 to sweep out the range of voltages and corresponding codes to convert the stored voltage on capacitor 16 to a stored digital value. The stored digital values are read out row by row as each row-select signal is asserted. Persons of ordinary skill in the art will readily understand that ramp/counter control unit 44 may easily be configured using conventional logic.

Figure 3:
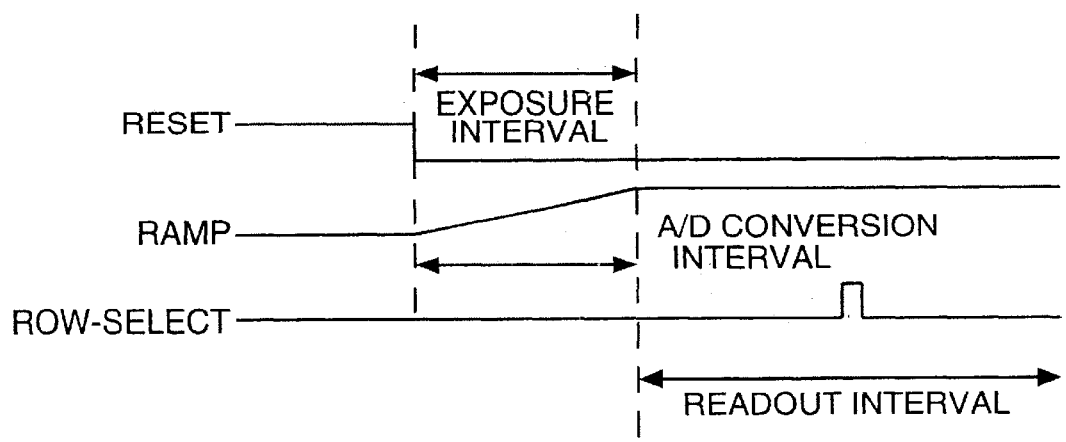
FIG. 3 is a timing diagram showing a second method for operating the digital storage pixel sensor of FIG. 1.

Referring now to FIG. 3, a timing diagram illustrates a second method for operating the digital storage pixel sensor 10 of FIG. 1 without the need to employ both the temporary storage capacitor 16 and MOS N-Channel Transfer transistor 18. According to the second method, the alternative is to start the ramp generator 24 and the initial count in counter 26 at or near the beginning of the exposure interval. According to this method, the count captured from counter 26 tells when the falling photodiode voltage crossed the rising ramp voltage. The method illustrated in FIG. 3 provides a wide dynamic range, since the cathode voltage on photodiodes capturing light for very intensely exposed pixels fall very rapidly and can be digitized early, while pixels receiving less light will be digitized later, giving them time to capture more photons. The ramp generator 24 programs the relationship between time and light, and can be nonlinear as has previously been disclosed herein. The code sequence out of counter 26 can also change non-uniformly in time. All these things affect the "opto-electronic conversion function" or OECF as it is known in the art.

Figure 4:
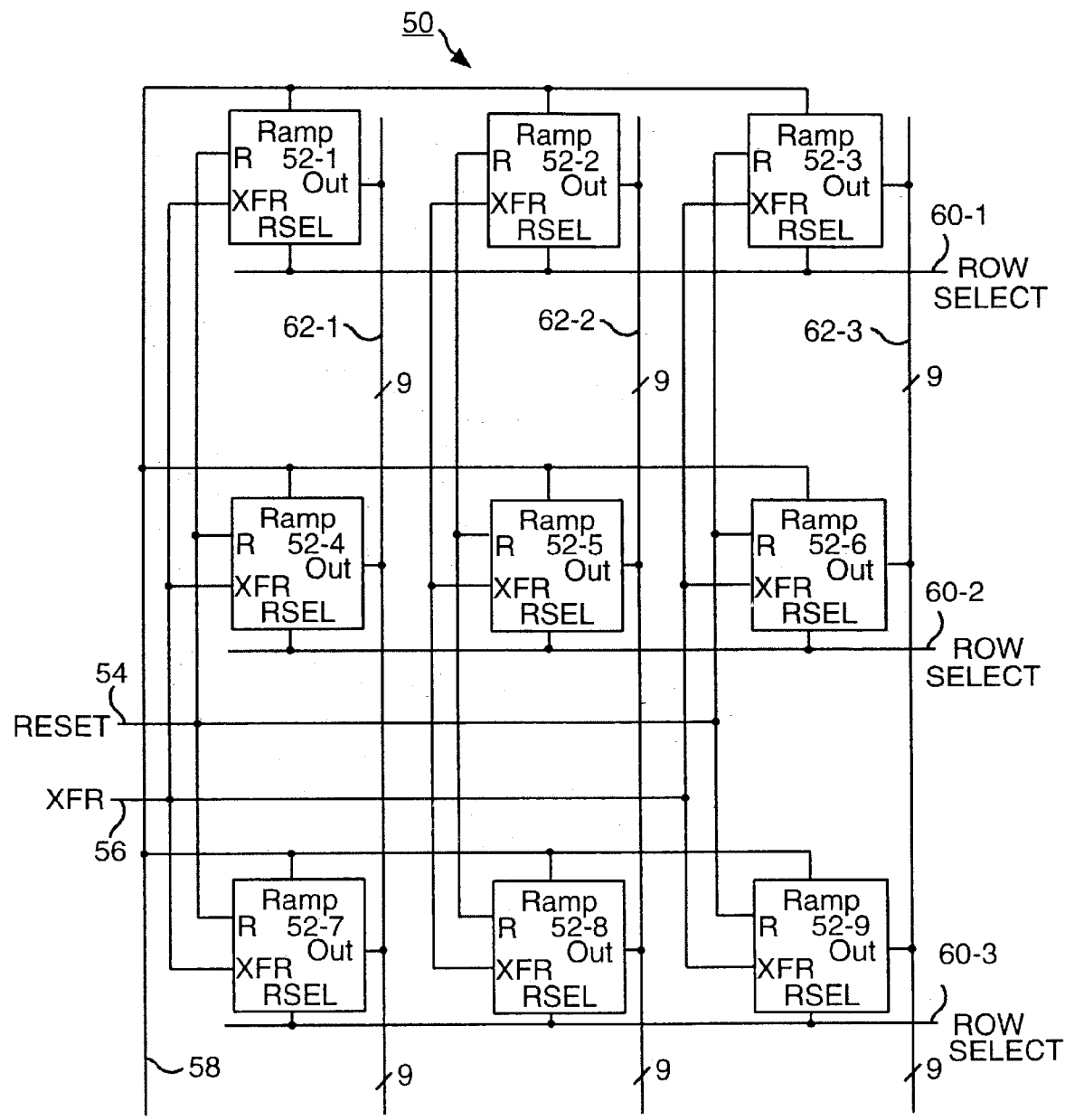
FIG. 4 is a block diagram showing a portion of an illustrative digital frame store array including a 3×3 matrix of digital pixel sensors according to the present invention.

Referring now to FIG. 4, a block diagram shows a portion of an illustrative digital frame store array 50 including a 3×3 matrix of digital storage pixel sensors according to the present invention. Each digital pixel sensor 52-1 through 52-9 contains the elements of FIG. 1 enclosed by the dashed line 35. As will be appreciated by persons of ordinary skill in the art, a common ramp generator 24 and counter 26 (as shown in FIG. 1) are used for the entire array.

The portion of an illustrative digital frame store array 50 includes a first row containing digital storage pixel sensors 52-1 through 52-3; a second row containing digital storage pixel sensors 52-4 through 52-6; and a third row containing digital storage pixel sensors 52-7 through 52-9. The portion of an illustrative digital frame store array 50 includes a first column containing digital storage pixel sensors 52-1, 52-4, and 52-7; a second column containing digital storage pixel sensors 52-2, 52-5, and 52-8; and a third column containing digital storage pixel sensors 52-3, 52-6, and 52-9.

As shown in FIG. 4, a common RESET line 54, a common XFR line 56, and a common RAMP line 58 are coupled to the respective RESET, XFR, and RAMP inputs of all digital pixel sensors in the array. First, second, and third ROW SELECT lines 60-1, 60-2, and 60-3, respectively, are coupled to the ROW SELECT inputs of all digital pixel sensors in the first, second, and third rows of the portion of the array 50 respectively.

The 9-bit busses 62-1, 62-2, and 62-3 form the column line outputs of the first, second, and third columns of the portion of the array 50 respectively. As shown in detail in FIG. 1, these busses are paralleled inside of counter 26 so that they may all be driven simultaneously with the counter output during the image capture process through tri-state buffers 30-1 through 30-9 as illustrated in FIG. 1. During readout, these 9-bit busses 621, 62-2, and 62-3 are coupled to the outputs of the DRAM cells through tri-state read amplifiers 36-1 through 36-9 as illustrated in FIG. 1 and their logic levels may be read from the array by amplification, latching, shifting, or any one of the many known data transferring methods known in the digital data processing arts.

In the illustrative embodiment of the present invention described in detail herein, each DRAM cell stores a single bit; i.e., the counter signal takes on only two discrete levels. As is well known in the art, it is also possible to store more than one bit in a DRAM cell, for example two bits if the counter signals take on four discrete levels. In general, the n-bit DRAM word can store at least an n-bit digital signal. Embodiments of the present invention that store more than n bits in n DRAM cells may be preferred in some cases.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A digital pixel sensor formed on a semiconductor substrate comprising:
a phototransducer responsive to light for providing an analog output signal that is a function of an incident amount of light;
a counter that generates an n-bit digital signal;
a ramp generator that generates a ramp reference signal independent of said n-bit digital signal from said counter;
a comparator configured to compare said analog output signal and said ramp reference signal; and
a plurality of n DRAM cells, said n DRAM cells configured to store said n-bit digital signal in response to said output of said comparator.

2. The digital pixel sensor of claim 1 wherein said n-bit digital signal is related to said ramp reference signal.

3. The digital pixel sensor of claim 1 wherein said n-bit digital signal is a function of said analog output signal.

4. The digital pixel sensor of claim 1 wherein said n-bit digital signal is an n-bit digital signal.

5. The digital pixel sensor of claim 4 wherein said n-bit digital signal is related to said ramp reference signal.

6. The digital pixel sensor of claim 4 wherein said n-bit digital signal is a function of said analog output signal.

7. A digital pixel sensor formed on a semiconductor substrate comprising:
a photodiode coupled to a capacitive storage element to produce an analog output signal;
a counter that generates an n-bit digital signal;
a ramp generator that generates a ramp reference signal independent of said n-bit digital signal from said counter;
a comparator configured to compare said analog output signal and said ramp reference signal; and
a plurality of DRAM cells responsive to said comparator to store a digital value of said n-bit signal from said counter that is related to said analog output signal.

8. The digital pixel sensor of claim 7 further including a reset switch coupled to said photodiode and said capacitive storage element.

9. The digital pixel sensor of claim 7 wherein said reset switch is coupled to said capacitive storage element through a transfer switch.

10. The digital pixel sensor of claim 7 wherein said comparator is coupled to write control circuitry for said plurality of DRAM cells.

11. A digital pixel sensor formed on a semiconductor substrate comprising:
a capacitive storage element having a first terminal coupled to a fixed potential and a second terminal;
a photodiode having a first terminal coupled to a first potential and a second terminal coupled to said second terminal of said capacitive storage element;
a semiconductor reset switch having a first terminal coupled to said second terminal of said photodiode and a second terminal coupled to a reset potential that reverse biases said photodiode;
a counter that generates an n-bit digital signal;
a ramp generator that generates a ramp reference signal independent of said n-bit digital signal from said counter;
a comparator configured to compare a voltage on said capacitive storage element and said ramp reference signal; and
a plurality of DRAM cells responsive to said comparator to store a digital value of said n-bit digital signal from said comparator related to said voltage on said capacitive storage element.

12. The digital pixel sensor of claim 11 further including a semiconductor transfer switch interposed between said second terminal of said photodiode and said second terminal of said capacitive storage element.

13. A digital imaging array formed on a semiconductor substrate comprising:

a plurality of row lines;

a plurality of column busses, each column bus comprising n column lines;

a digital circuit configured to output an n-bit digital signal;

a ramp generator that generates a ramp reference signal independent of said n-bit digital signal from said digital circuit; and an array of digital pixel sensors, each digital pixel sensor associated with one row line and one column bus in said array and comprising a phototransducer responsive to light for providing an analog output signal that is a function of an incident amount of light, a comparator configured to compare said analog output signal and said ramp reference signal, and a plurality of n DRAM cells, each of said n DRAM cells coupled to one of said n column lines in the column bus associated with its pixel sensor and configured to store said n-bit digital signal from said digital circuit in response to said output of said comparator.

14. The imaging array of claim 13 wherein said phototransducer is a photodiode.

15. The imaging array of claim 13 wherein said digital circuit comprises an n-bit counter synchronized with said ramp generator.

16. The imaging array of claim 15 wherein said an n-bit counter has n output lines selectively coupled to ones of said n column lines.

17. The imaging array of claim 16 further including a plurality of read amplifiers, each of said read amplifiers coupled to a different one of said n column lines from each of said column busses in said array.

18. The imaging array of claim 16 wherein said read amplifiers each have outputs that can be selectively switched between a first high-impedance state and a second state in which signals at said outputs are a function of signals at inputs thereof.

19. A digital imaging array formed on a semiconductor substrate comprising:

a plurality of row lines;

a plurality of column busses, each column bus comprising n column lines;

a digital circuit configured to output an at least n-bit digital signal;

a ramp generator that generates a ramp reference signal independent of said n-bit digital signal from said digital circuit; and an array of digital pixel sensors, each digital pixel sensor associated with one row line and one column bus in said array and comprising a capacitive storage element having a first terminal coupled to a fixed potential and a second terminal, a photodiode having a first terminal coupled to a first potential and a second terminal coupled to said second terminal of said capacitive storage element, a semiconductor reset switch having a first terminal coupled to said second terminal of said photodiode and a second terminal coupled to a reset potential that reverse biases said photodiode, a comparator configured to compare a voltage on said capacitive storage element and said ramp reference signal; and a plurality of DRAM cells responsive to said comparator to store a digital value of said n-bit digital signal from said digital circuit that is related to said voltage on said capacitive storage element.

20. The digital imaging array of claim 19 wherein each of said digital pixel sensors further includes a semiconductor transfer switch interposed between said second terminal of said photodiode and said second terminal of said capacitive storage element.

21. The imaging array of claim 19 wherein said digital circuit comprises an n-bit counter synchronized with said ramp generator.

22. The imaging array of claim 21 wherein said an n-bit counter has n output lines selectively coupled to ones of said n column lines.

23. The imaging array of claim 22 further including a plurality of read amplifiers, each of said read amplifiers coupled to a different one of said n column lines from each of said column busses in said array.

24. The imaging array of claim 23 wherein said read amplifiers each have outputs that can be selectively switched between a first high-impedance state and a second state in which signals at said outputs are a function of signals at inputs thereof.

* * * * *